(12) United States Patent
Cohen

(10) Patent No.: US 7,574,611 B2
(45) Date of Patent: Aug. 11, 2009

(54) COMMAND DECODER FOR MICROCONTROLLER BASED FLASH MEMORY DIGITAL CONTROLLER SYSTEM

(75) Inventor: Daniel Scott Cohen, Baltimore, MD (US)

(73) Assignee: Atmel Corporation, San Jose, CA (US)

( * ) Notice: Subject to any disclaimer, the term of this patent is extended or adjusted under 35 U.S.C. 154(b) by 602 days.

(21) Appl. No.: 11/288,753

(22) Filed: Nov. 28, 2005

(65) Prior Publication Data
US 2007/0124566 A1 May 31, 2007

(51) Int. Cl.
G06F 1/26 (2006.01)
(52) U.S. Cl. .................. 713/300; 713/320; 713/323
(58) Field of Classification Search .......... 713/300, 713/322
See application file for complete search history.

(56) References Cited

U.S. PATENT DOCUMENTS

| | | | |
|---|---|---|---|
| 5,353,420 A * | 10/1994 | Zaidi | 712/210 |
| 5,487,092 A | 1/1996 | Finney et al. | |
| 5,687,345 A | 11/1997 | Matsubara et al. | 711/103 |
| 5,721,937 A * | 2/1998 | Kurihara et al. | 713/323 |
| 6,009,496 A | 12/1999 | Tsai | 711/103 |
| 6,154,788 A | 11/2000 | Robinson et al. | 710/8 |
| 6,278,654 B1 | 8/2001 | Roohparvar | 365/238.5 |
| 6,438,068 B1 | 8/2002 | Roohparvar | 365/238.5 |
| 6,442,076 B1 | 8/2002 | Roohparvar | 365/185.33 |
| 6,584,540 B1 | 6/2003 | Shinmori | 711/103 |
| 6,606,269 B2 | 8/2003 | Roohparvar | 365/185.33 |
| 6,654,848 B1 | 11/2003 | Cleveland et al. | 711/103 |
| 6,657,899 B2 | 12/2003 | Roohparvar | 365/185.33 |
| 6,691,270 B2 * | 2/2004 | Blasco et al. | 714/729 |
| 6,754,765 B1 | 6/2004 | Chang et al. | 711/103 |
| 6,778,436 B2 | 8/2004 | Piau et al. | 365/185.03 |
| 6,810,477 B1 | 10/2004 | Miyabe et al. | |
| 6,845,454 B2 * | 1/2005 | Kim | 713/300 |
| 7,120,810 B2 * | 10/2006 | Maher et al. | 713/323 |
| 7,200,723 B1 * | 4/2007 | Ansari et al. | 711/154 |
| 7,243,212 B1 * | 7/2007 | Purcell et al. | 712/34 |
| 2003/0067814 A1 | 4/2003 | Piau et al. | 365/189.05 |
| 2003/0079077 A1 | 4/2003 | Piau et al. | 711/103 |
| 2003/0131185 A1 | 7/2003 | Dover | 711/103 |
| 2004/0049627 A1 | 3/2004 | Piau et al. | 711/103 |

FOREIGN PATENT DOCUMENTS

WO WO-07062259 A2 5/2007

* cited by examiner

*Primary Examiner*—Nitin C Patel
(74) *Attorney, Agent, or Firm*—Schwegman, Lundberg & Woessner P.A.

(57) ABSTRACT

A command decoder used for a microcontroller based Flash memory digital controller system includes multiple subsystems, including the command decoder, which serves as the main user interface for interpreting commands from a user and managing the priority of commands and command modes. The command decoder also stores crucial information including address, data, opcodes, and various flags registers that are used by other subsystems including the program buffer, burst read module, register block, and microcontroller. In addition, the command decoder contains clock synchronization logic, controls the sleep function of the microcontroller and serves as a test mode controller.

18 Claims, 3 Drawing Sheets

COMMAND DECODER FOR MICROCONTROLLER BASED FLASH MEMORY DIGITAL CONTROLLER SYSTEM

FIELD OF THE INVENTION

The present invention relates to Flash memory digital controller systems, and more particularly to microcontroller based flash memory digital controller systems.

BACKGROUND OF THE INVENTION

The use of a digital controller system for the storage and retrieval of digital information to and from a non-volatile Flash memory module is known in the art. However, conventional digital controller systems typically use hardwired state machines, which are generally inflexible. Such hardwired state machines typically require recoding for any change in the decoding of commands.

Accordingly, there exists a need for an improved microcontroller based Flash memory digital controller system. The improved system should include a command decoder capable of flexible management of commands and offloading the microcontroller to provide speed improvements and power savings. The present invention addresses such a need.

SUMMARY OF THE INVENTION

The present invention provides a command decoder used for a microcontroller based Flash memory digital controller system. The digital controller comprises multiple subsystems including the command decoder, which serves as the main user interface for interpreting commands from a user and managing the priority of commands and command modes. The command decoder also stores crucial information including address, data, opcodes, and various flags registers that are used by other subsystems including the program buffer, burst read module, register block, and microcontroller. In addition, the command decoder contains clock synchronization logic, controls the sleep function of the microcontroller and serves as a test mode controller.

DETAILED DESCRIPTION

The present invention provides a command decoder for a microcontroller based Flash memory digital controller system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 1 through 3 in conjunction with the discussion below.

A command decoder in accordance with the present invention provides a user interface, command interpreter, and system manager of a digital controller system for the storage and retrieval of digital information to and from a non-volatile flash memory module. Specifically, the command decoder comprises a digital state machine that acts as a bridge between the asynchronous user domain and the synchronous digital controller system built around, for example, a standard 8-bit microcontroller. The command decoder provides for detection and management of user commands, management of information related to commands, control of the system clock, and waking up the microcontroller when the command requires a complex "timed" command. A timed command, as used in this specification, is a command which cannot be executed in one cycle, but rather, requires a series of events to occur in order for the command to be fully executed. The microcontroller is used to perform the steps involved in timed events. Examples of timed events include programming and erasing the Flash memory, setting or clearing non-volatile lock bits, page transfers from the Flash memory to the program buffer, and various test mode and extended commands.

Figure 1:
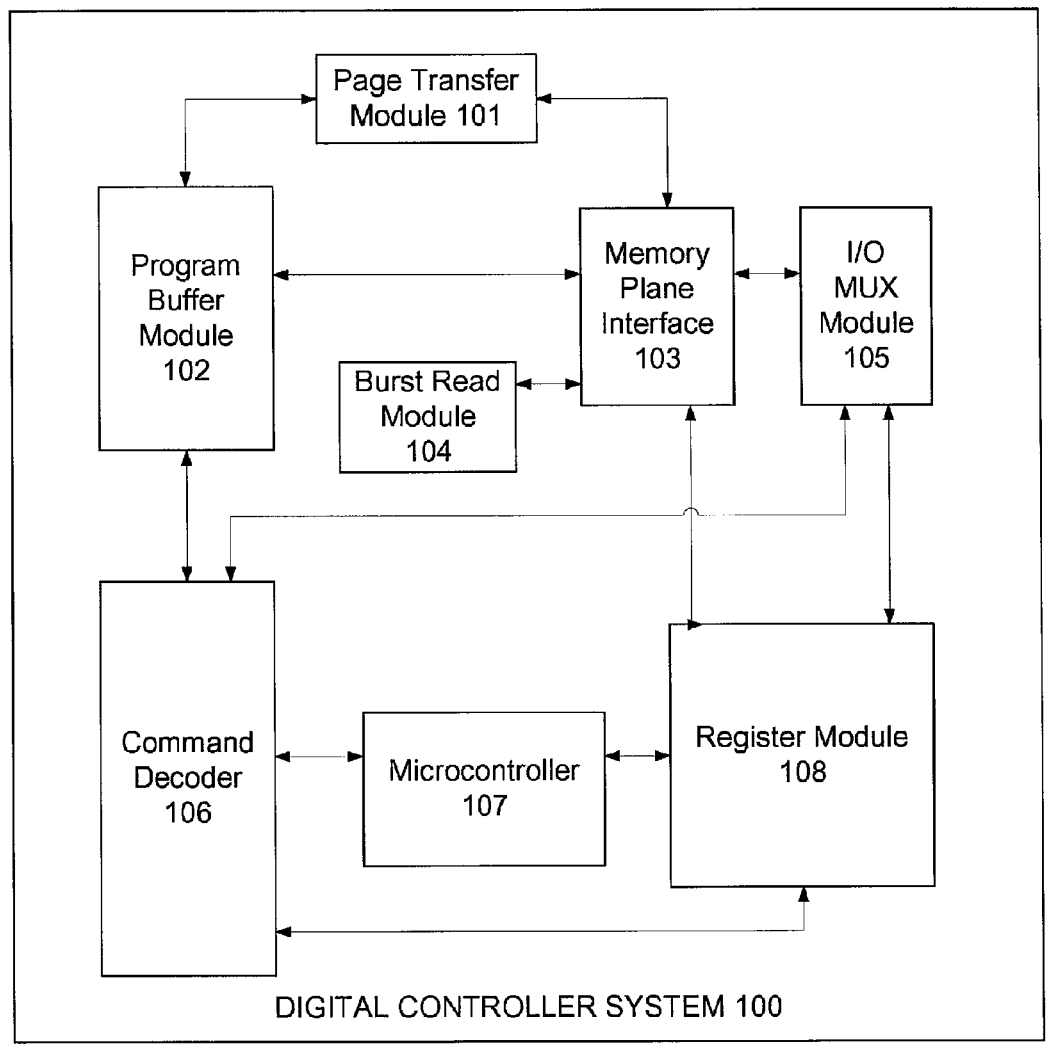
FIG. 1 illustrates a preferred embodiment of a digital controller system comprising a command decoder in accordance with the present invention.

FIG. 1 illustrates a preferred embodiment of a digital controller system comprising a command decoder in accordance with the present invention. The digital controller system 100 comprises a standard microcontroller 107. Separately from the microcontroller 107, the digital controller system 100 comprises a page transfer module 101, a program buffer module 102, a memory plane interface 103, a burst read module 104, a input/output (I/O) multiplexer (MUX) module 105, a command decoder 106, and a register module 108, the functions of which are described in co-pending U.S. patent application, entitled, "Microcontroller Based Flash Memory Digital Controller System", Ser. No. 11/288,509, filed on Nov. 28, 2005, assigned to the assignee of the present application, which is incorporated herein by reference.

Figure 2:
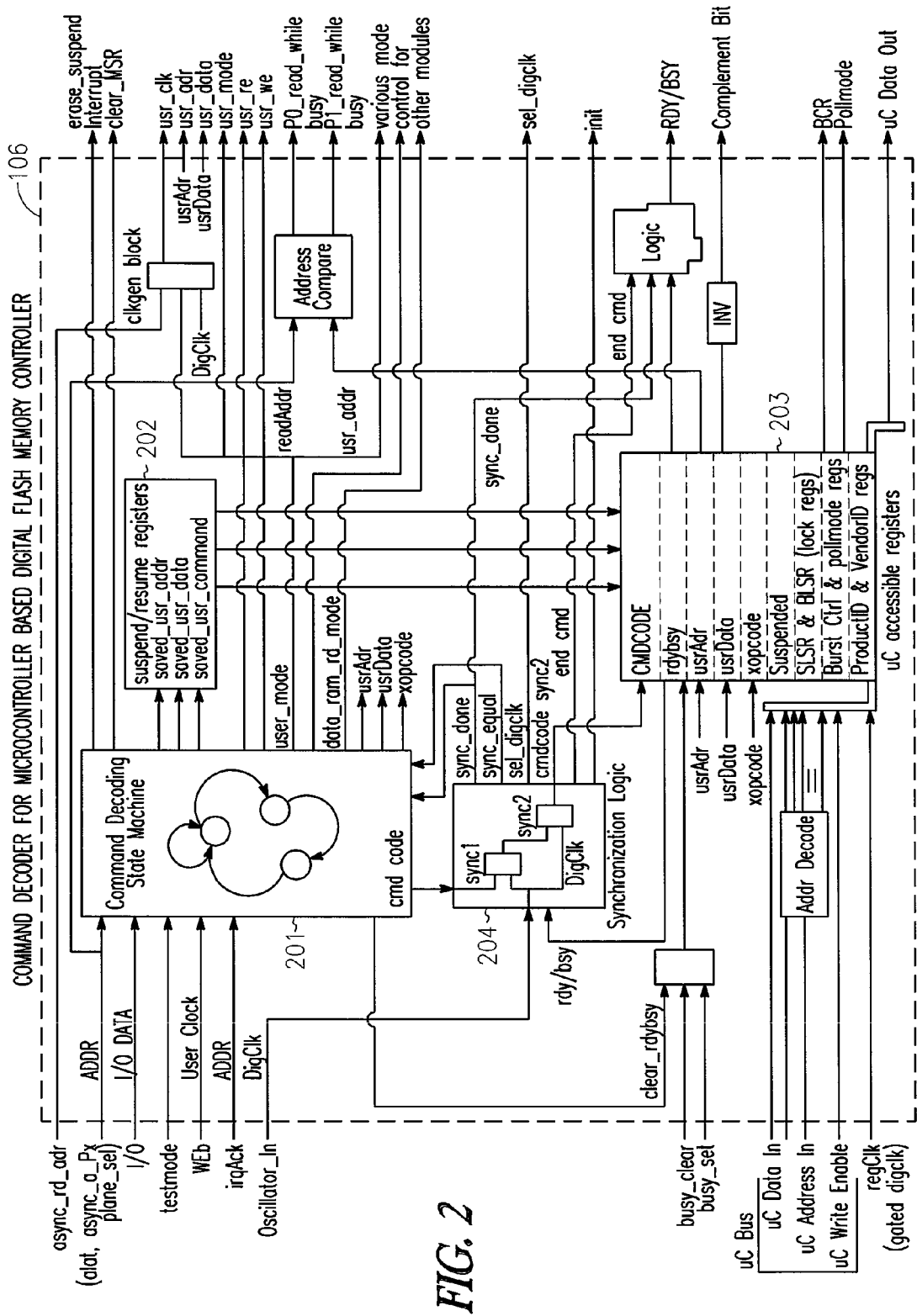
FIG. 2 illustrates a preferred embodiment of the command decoder of FIG. 1 in accordance with the present invention.
Figure 3:
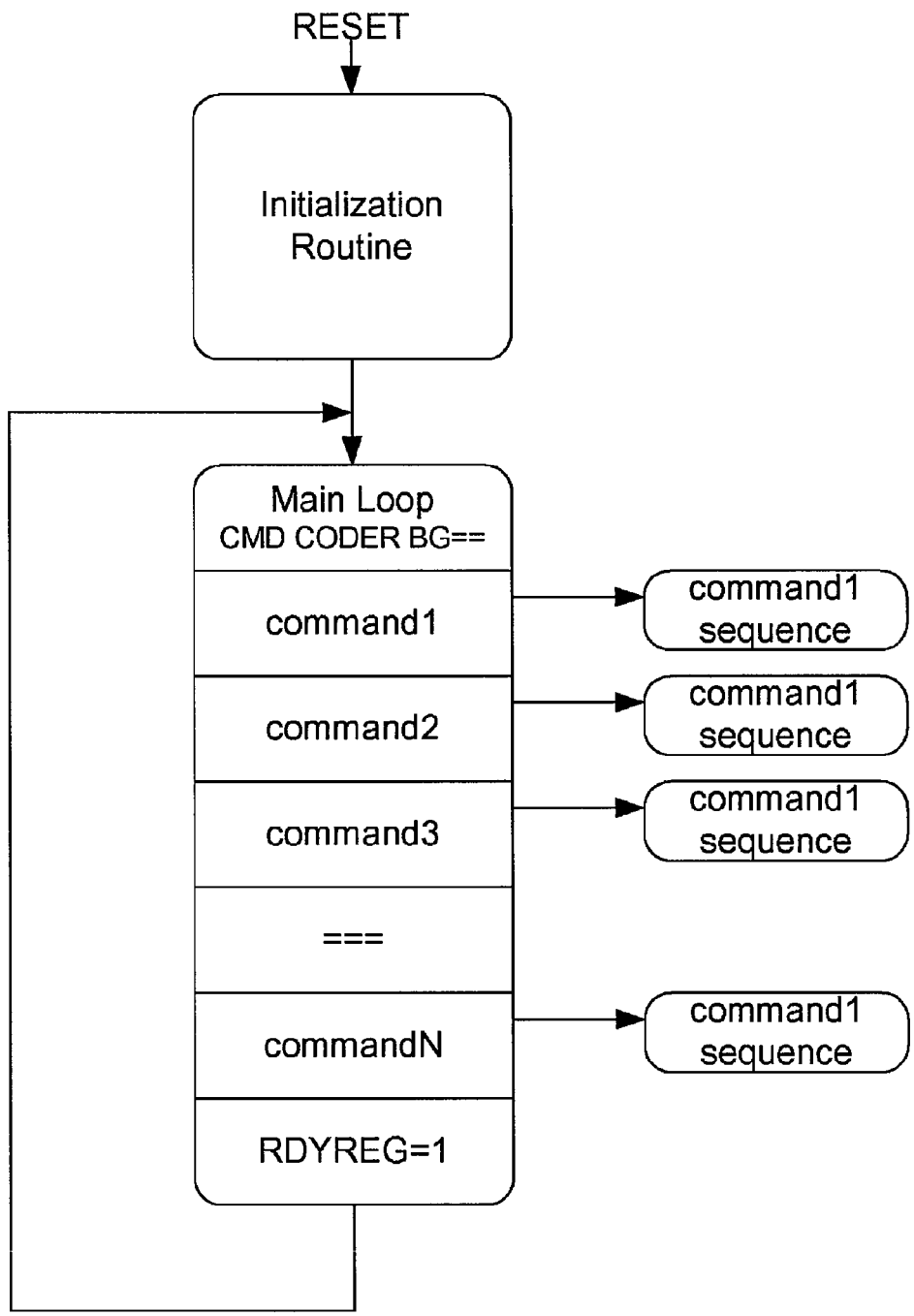
FIG. 3 illustrates a scheme for a timed event requiring the use of the microcontroller in accordance with one embodiment of the present invention.

FIG. 2 illustrates a preferred embodiment of the command decoder 106 (FIG. 1) in accordance with the present invention. As shown in FIG. 2, the command decoder 106 comprises a command decoding state machine 201, suspend/resume registers 202, microcontroller accessible registers 203, and synchronization logic 204. The command decoding state machine 201 decodes user commands and provides two clock domains, a user clock and a system clock. The user clock (UserClock) runs at a speed determined by a user's access sequence. The system clock (DigClk) runs off the digital controller system's system clock. The two clock domains allow the digital controller system 100 to accept commands at the user's desired speed without having to make them wait for signals from the cycle based microcontroller 107. The suspend/resume registers 202 store state information when a command is suspended and later restored. The registers 203 are microcontroller accessible for functions as described further below. The synchronization logic 204 synchronizes the domains and ensures signals cross from the user to the Flash controller in a deterministic and orderly manner. The synchronization logic 204 also synchronizes a wake signal to the microcontroller 107 when a command requires a timed command.

The command decoder 106 solves the following problems:

The command decoder 106 interfaces a high speed variable data rate user system to a slower speed fixed cycle-time microcontroller based Flash memory controller. This is done by using a high speed hardware implemented state machine, i.e., the command decoder state machine 201, that contains two clock domains, one running at speeds determined by the user's access sequences (UserClock) and the other running off the digital controller's system clock (DigClk). This allows the digital controller system 100 to accept commands at the user's desired speed without having to make them wait for signals from the cycle based microcontroller 107. Furthermore, it allows the digital controller system 100 to provide immediate feedback to the user in the form of a "Ready" (RDY/BSY) signal that would not be easily done using a pure microcontroller based solution. The Ready signal is cleared in the user clock domain and set by firmware in the DigClk domain. The rising Ready signal that the user sees on the device I/O is a function of the internal RDYBSY register, the sync-done signal, and the endcmd signal. This allows an additional number of DigClk cycles between when the firmware sets the RDYBSY register and when the user is notified that the device is ready for additional commands. These additional cycles are useful to allow the firmware some additional cleanup cycles if necessary, and to allow the microcontroller 107 to gracefully go to sleep.

In one embodiment, the command decoder 106 solves the problem of complex asynchronous clock domains that is created when interfacing the fixed speed digital controller to the unknown or variable speed user system. The problem is solved by having the command decoder 106 be responsible for synchronizing the domains and ensuring that signals cross from the user to the Flash controller in a deterministic and orderly manner. The synchronization logic 204 is unique in that the synchroniazation logic 204 (in one embodiment) is tightly coupled to both the RDYBSY register and the sleep function of the microcontroller 107. The microcontroller 107 will not wake up from sleep mode until a new "timed event" command has been decoded and synchronized to the digital domain. At this point, the sel_digclk signal will go high and wake up the microcontroller 107. Firmware can now safely read the CMDCODE register from the digital domain as well as the user address, user data, and opcode registers.

In one embodiment, the command decoder 106 solves the problem of power management by allowing the command decoder 106, as a hardware-implemented state machine, to be always "on" and serve as a watch dog to wake the higher power microcontroller 107 when necessary through use of a sleep mechanism.

In one embodiment, the command decoder 106 solves the problem of clock control by generating a clock for peripherals and memories requiring clock signals for access while the microcontroller 107 is asleep. Additionally, the command decoder 106 prevents glitches when turning on and off the system clock by doing it in a controller manner (e.g., turning the clock on and off while oscillator is low). The sel_digclk signal is used in the CPU module of the system 100 to gate the DigClk signal to the microcontroller 107.

In one embodiment, the command decoder 106 solves the problem of command management by: (1) storing address and opcode information in the registers 203 for access by the microcontroller 107; (2) controlling command priority blocking or allowing certain commands based on the state of the system 100; (3) generating interrupts as necessary to the microcontroller 107 and handling the ACK (acknowledgement) of the interrupt from the microcontroller 107; and (4) storing and restoring certain state information when a command is suspended and later restored. State information that is stored and restored includes the "command code" of the command to be restored, as well as the corresponding address and data of the command. This can be seen in FIG. 2 as the suspend/resume registers 202. The CMDCODE register, usrAdr, and usrData registers are restored from these saved registers when a legal resume command is receive.

In one embodiment, the command decoder 106 solves the problem of test mode control by interpreting test mode commands and controlling the necessary test mode signals when such a command is decoded. These test modes allow direct access to necessary test mode signals when such a command is decoded. These test modes allow direct access to RAMs, ROM, and registers on the microcontroller's address and data buses. Therefore, this feature is tightly coupled to the sleep function of the microcontroller 107. These modes can only be accessed when the microcontroller 107 is asleep to prevent contention. Hardware prevents access until the microcontroller 107 is asleep. A special sleep command allows the user to put the microcontroller 107 to sleep at any time except during initialization. Firmware can be architected to get around this limitation by polling a pin (such as a GPIO (general-purpose I/O) pin) during boot, with this pin indicating that the device should stop booting and go to sleep.

Special test modes include: (1) the ability to make the microcontroller's program counter (address of firmware ROM) observable on the system outputs for use during debug and evaluation; (2) the ability to read and write directly to all onboard memories that comprise the digital controller system 100; (3) the ability to read and write directly to all registers on the microcontroller's data bus; (4) the ability to put the microcontroller 107 to sleep based on a specific user command while in test mode; and (5) the ability to look at the state of the test mode pin while interpreting "extended commands".

In one embodiment, the command decoder 106 solves the problem of extendibility of commands. Because most of the commands that will be decoded are decided upon when the system 100 is architected and thus incorporated into hardware, it is desirable to have the ability to add new commands in software. Such extensibility is provided by the command decoder 106 through the use of the "Extended Command" command. When the "Extended Command" is sent, the user also sends an (e.g., 8-bit) opcode that is stored in the opcode register by the command decoder 106. The command decoder 106 then wakes up the microcontroller 107, informing it that a command is present. When the firmware sees that the command is the "extended command" it knows to read the opcode register and the proceeds based on the value of the opcode. This provides the possibility of 256 additional commands that can be added after the system 100 is fabricated. Furthermore, by looking at the value of the test mode signal, the system 100 can support up to 256 additional test mode commands.

In one embodiment, the command decoder 106 is responsible for detecting three types of commands:

1. A direct user command: In this case, the command decoder 106 directly accesses registers, signals, or memories as required by the command. Access is quick and the microcontroller 107 remains asleep.

2. A timed event requiring the use of the microcontroller/firmware: In this case, the command decoder 106 drops the RDY signal and wakes up the microcontroller 107. When the microcontroller 107 wakes up the microcontroller 107 simply starts executing firmware code at the point where it left off. Therefore, as illustrated in FIG. 3, this scheme requires that the firmware be architected such that the main routine is a simple loop that polls the CMDCODE register. It then calls the appropriate function or subroutine based on the value of the CMDCODE register. When the action handling the routine finishes, it returns to the main loop whose last (or nearly last) step is to set RDY high thus putting itself to sleep.

3. A Suspend command whose purpose is to interrupt a currently executing timed event. In this case, the command decoder 106 generates an interrupt to the microcontroller 107. The suspend command sequence is contained in the firmware's interrupt handler.

A separate command decoder 106 serving as a user interface allows commands to be received and managed independently of the microcontroller 107. The command decoder 106 serves as a traffic-cop for the system and acts on legal commands and ignores illegal ones. When a command is acted on it is either done so solely by the command decoder 106 or by waking up the microcontroller 107. An example of a command not requiring the use of the microcontroller 107 is a read command, or a write to the burst control register, or write to the soft/hard lock registers. An example of a command requiring the use of the microcontroller 107 is a program or erase, or any other "timed" command.

This stand-alone command decoder 106 offers the following advantages:

(1) Tightly coupled synchronization sleep, and ready/busy control offers an elegant solution to a complex multi-clock user interface.

(a) It makes it possible to have a hybrid digital flash memory controller system 100 where by complex multi-cycle event commands can be handled by the flexibility offered by a microcontroller 107 without giving up the speed advantages of a dedicated state machine for handling simple commands. The hybrid system also makes it possible to use a smaller low power state machine for command interpretation and simple command execution thus saving power by only using the microcontroller 107 when it is necessary.

(b) The command decoder 106 offloads the microcontroller 107 so that the microcontroller 107 need not be concerned with new commands, command prioritization, or management while the microcontroller 107 is working on a command. This provides code efficiency and allows for quicker processing of timed events which is crucial for quick programming and erasing of the Flash memory, which is a key metric of competitiveness.

(c) The command decoder 106 allows the microcontroller 107 to be turned off (put to sleep) when there is no timed event underway. This saves power which is vital in low power battery operated systems.

(2) Supports the ability to simultaneously read and write the flash memory by storing the address of the write operation and comparing it to the address of the read command. The command decoder 106 is knowledgeable of the multi-plane architecture of the underlying Flash memory that allows reading one plane while writing another. The command decoder 106 is capable of distinguishing which operation is taking place in what plane and acting accordingly to allow the read to take place or block it and provide status information (including polling status) to the user instead of read data.

(3) Generates interrupts should an "erase suspend" command be issued while the microcontroller 107 is busy processing an erase command and tracks the progress of the erase routine that was suspended so that it can be resumed at the correct point in the multi step erase procedure.

The command decoder 106 also is able to save off the state of the command by storing the command code, data, and address in registers that are later restored when the resume command is executed. This, together with a flag that indicates that an erase command has been previously suspended, and a suspend status register (SSR) (arbitrarily located in a different block) that stores additional state information about the operation being suspended, makes it possible for the firmware to gracefully pick up where it left off when a valid resume command is decoded.

The suspend status register offers advantages for the erase suspend and erase resume operations. Since an erase command involves many steps depending on the size of the data being erased (the type of erase command) it is advantageous to keep track of how far along in the sequence the command has progressed so that if the command is interrupted by a suspend command the firmware can later know where to pick up again when the command is resumed. The (e.g., 8-bit) suspend status register serves this purpose. As the firmware progresses through an erase command keeps track of each step in the SSR. When an erase resume command is issued the firmware looks at the SSR to know what has already been done so that it needn't re-run completed steps.

(4) Decouples the command clock from the microcontroller clock, allowing the microcontroller 107 to run at a set speed asynchronous to the clock of the system where the digital controller flash module will be used. This also allows quick responses to user commands even where multi-cycle timed events will occur. This makes it possible for the ready signal to be dropped instantly by the command decoder 106 despite the fact that it will take some time for the microcontroller 107 to recognize the command.

A further advantage of using the command decoder 106 as the interface between the user and the synchronous flash memory controller is that all clock domain crossings can be managed in one place. This allows for a simpler interface between the user clock and the system clock and makes it easier to reliably send signals between them. It also makes realization of the clock tree simpler and simplifies timing constraints used in synthesizing and checking timing on the system. Overall it makes for a more reliable system.

(5) Provides for software extendable commands whereby a single command called the "extended command" is interpreted along with an opcode that the command decoder 106 stores into a separate opcode register.

When this command is received, the microcontroller 107 is awoken and knows to look at the opcode register. Depending on the value of the opcode, the firmware will adapt its behavior. By using, for example, an 8-bit opcode register and a test mode signal, up to 256 additional user commands and 256 additional test mode commands are provided.

(6) Serves as a test interface to the digital controller system 100 that provides for:

(a) User observability of the microcontroller's program counter (address counter) that can be used to determine what the microcontroller 107 is doing at any given time. This can be particularly helpful should the firmware hang or an intermittent bug occur.

(b) Access to all the registers on the microcontroller's data bus while the microcontroller 107 is asleep. This feature can be very useful during evaluation and debug in determining the state of the system should a problem be detected. This is accomplished by having the command decoder 106 take control of the microcontroller's address and databus during a specific test mode. In one embodiment, this mode can only be entered when the microcontroller 107 is asleep. This prevents any contention on the buses. A central bus multiplexing unit located in the block containing the microcontroller 107 outputs a single address bus and clock such that the registers on the bus need not be aware that this debug mode exists. They simply respond to the clock and address as normal, having no idea whether the true source is the firmware acting through the microcontroller 107 or the user acting through the command decoder 106.

(c) Provides address space remapping. This forms a seamless border between registers that are accessible by the user and which must be located at a specific address as indicated by the product specification and those same registers, which must exist in the address space of the microcontroller 107. Putting the registers at a microcontroller address that is dictated by the Flash memories product specification is an unnecessary and burdensome constraint on the system architects. Furthermore, it is desirable to put more than one actual register at the same address depending on the mode or on what block/sector/plane is being addressed. Using a memory remapping scheme allows the command decoder 106 to take logical addresses from the user and remap them to their physical location in the microcontroller's address space.

(d) Access to all the RAM's and ROM in the digital memory controller. This allows direct reads and writes to the program buffer in both normal and test mode and allows for direct read and write of the microcontroller's data RAM and instruction RAM. The ROM can be read but not written.

(e) Puts the microcontroller 107 to sleep should it be necessary to debug the state of the system 100 while the microcontroller 107 is running.

(f) Simplifies firmware with a single "exit" command for many modes. In one embodiment, one exit command exits the following modes: Exit register read mode; Exit microcontroller register read mode; Exit pollmode; Exit Instruction SRAM Read mode; Exit Data SRAM read mode; Exit Page (Program) Buffer SRAM read mode; Exit ROM read mode; Exit PC (Program Counter) read mode.

(7) Provides control signals to other subsystems:

(a) User Mode: indicates to other blocks what address, data, or other signals should be multiplexed into their blocks:

(i) READ: This is the normal user read of the Flash memory core;

(ii) REG: This is for user reads of the microcontroller's registers;

(iii) ISRAM: Read/Write to the instruction SRAM in test mode;

(iv) DSRAM: Read/Write to the microcontroller's data RAM in test mode;

(v) PSRAM: Read/Write to the program buffer RAM in test mode;

(vi) ROM: Read of the main instruction ROM in test mode;

(vii) PC: Bring the microcontroller's program counter out through the data I/O for debug and evaluation in test mode.

(b) Ready/Busy Flag—Indicates whether the system is ready to take new commands or busy processing a command and is an integral part of the synchronization and sleep logic. In one embodiment, the Ready/Busy flag is provided to the user through a top level I/O signal and through a data output in polling mode, but is also made available to other subsystems for decision making. In addition, the Ready/Busy flag is used to put the device to sleep. Firmware and other subsystems have write access to the ready/busy register and by setting it high (ready) can put the device to sleep. Setting it low wakes up the device.

(c) Clear MSR Signal—The MSR (Memory Status Register) is located in the program buffer module and indicates which sectors of the page are being programmed. The command decoder 106 sends a signal to clear the MSR when the "Clear PB Flags" command is issued by the user.

(d) "Plane 0 read while busy" signal/"Plane 1 read while busy" signal—This output of the command decoder 106 indicates that the user is trying to read from a busy plane. The flash memory is comprised of multiple planes so that it is possible for the user to read from one plane while a "timed event" is taking place in the other plane. The plane with an active event (command) is "busy". When the user tries to read from the busy plane the "read while busy" signals are set and output to other subsystems so that they can act accordingly. For instance, the I/O mux module 105 knows that if pollmode is active and the read while busy signal is also active, then the user needs to be provided with certain data regarding the status of the current command. Also the burst read module 104 uses this information to know whether it is trying to read a busy plane, in which case it needs to gracefully stop.

(e) Complement Bit—The complement of data being written needs to be provided to the user in the event that they attempt to read from the busy plane while the firmware is carrying out a word/byte or single pulse program command. The command decoder 106 is in the unique position to know the value of the word or byte being programmed and provide it's complement to the I/O mux module 105 so that it can output to the user.

(f) Pollmode signal—The pollmode register is located in the command decoder 106 but is used in the I/O mux module 105 in making the decision of what data to provide to the user when the "read while busy" signals are active. Consequently, the pollmode signal is provided as an output to the I/O mux subsystem.

(g) "Exit Pollmode" signal—The error bit register is located in a subsystem called the register module 108. This bit stores the error status of a command while it is active and after it is active if pollmode is on. When the user exits pollmode (a user command) the command decoder 106 sends a signal to the register module 108 indicating that it is exiting pollmode so that the register module 108 can clear the error bit.

(h) Init flag—The init flag is a register that indicates that the device is initializing. The init flag is set high when the device is reset by the user or by power up and stays high until the first time the firmware sets the Ready/Busy Flag high. The init flag is useful for a number of reasons. In one embodiment, the init flag is used to block address changes on the main user address bus during initialization. This prevents damage to the part that can be caused by charge pumps activating before all initialization is complete. The init flag is used to clock the POR_LAT register in the register module 108 which stores a value that indicates whether the device has been reset by the user or by a power on reset. This knowledge is crucial to the firmware in determining whether to run a fill initialization boot routine or a shortened routine. The shorter routine during user reset is preferential since it requires significantly less time and makes for a faster more competitive part. It is used by the command decoder 106 to make sure that when the part is reset it initializes in its wake-up state so that the firmware can go through its boot routine.

(i) "Select Digital Clock" signal—This is used to gate the clock to the microcontroller 107 and thus controls the low power mode of the device. Also by turning off the digital clock and putting the microcontroller 107 to sleep it is possible for the command decoder 106 to take control of the microcontroller's data and address buses without causing contention. This is important during test mode access to the registers on the data bus.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A command decoder, comprising:
a command decoding state machine for decoding a command;

a plurality of registers accessible by a microcontroller for storing information about the command; and a wake signal, wherein the wake signal is sent to the microcontroller when the command requires a timed command, wherein the command is offloaded to the microcontroller when the microcontroller is awake.

2. The command decoder of claim 1, wherein the command decoder manages user commands independently of the microcontroller.

3. The command decoder of claim 1, wherein the command decoding state machine handles non-timed commands, wherein the synchronization wakes up the microcontroller is awoken when the command requires the timed command, wherein the microcontroller is put to sleep when not used.

4. The command decoder of claim 3, wherein the timed command comprises a command that cannot be executed in a single cycle and requires a series of events to occur in order for the timed command to be fully executed.

5. The command decoder of claim 1, further comprising suspend/resume registers for storing state information when the command is suspended and later restored.

6. The command decoder of claim 1, wherein the command decoding state machine further comprises a synchronization logic for managing a plurality of clock domains, wherein the plurality of clock domains comprises:

a user clock running at a speed determined by a user's access sequences; and a digital controller system clock, wherein user commands are accepted by the user clock speed without having to wait for signals based on the digital controller system clock.

7. The command decoder of claim 1, wherein the command decoder provides test mode control when a test mode command is received, wherein the test mode command is interpreted and any necessary test mode signals are controlled according to the test mode command.

8. The command decoder of claim 1, wherein the command decoder comprises a means for adding new commands in software.

9. The command decoder of claim 1, wherein the command decoder is operable to take logical addresses from a user and remap the logical addresses to a corresponding physical location in an address space of the microcontroller.

10. A digital controller system, comprising:
a microcontroller; and
a command decoder coupled to the microcontroller, wherein the command decoder comprises, a command decoding state machine for decoding a command;

a plurality of registers accessible by a microcontroller for storing information about the command; and a wake signal, wherein the wake signal is sent to the microcontroller when the command requires a timed command, wherein the command is offloaded to the microcontroller when the microcontroller is awake.

11. The system of claim 10, wherein the command decoder manages user commands independently of the microcontroller.

12. The system of claim 10, wherein the command decoding state machine handles non-timed commands, wherein the microcontroller is awoken when the command requires the timed command, wherein the microcontroller is put to sleep when not used.

13. The system of claim 12, wherein the timed command comprises a command that cannot be executed in a single cycle and requires a series of events to occur in order for the timed command to be fully executed.

14. The system of claim 10, wherein the command decoder further comprises suspend/resume registers for storing state information when the command is suspend and later restored.

15. The system of claim 10, wherein the command decoding state machine further comprises a synchronization logic for managing a plurality of clock domains, wherein the plurality of clock domains comprises:

a user clock running at a speed determined by a user's access sequences; and a digital controller system clock, wherein user commands are accepted by the user clock speed without having to wait for signals based on the digital controller system clock.

16. The system of claim 10, wherein the command decoder provides test mode control when a test mode command is received, wherein the test mode command is interpreted and any necessary test mode signals are controlled according to the test mode command.

17. The system of claim 10, wherein the command decoder comprises a means for adding new commands in software.

18. The system of claim 10, wherein the command decoder is operable to take logical addresses from a user and remap the logical addresses to a corresponding physical location in an address space of the microcontroller.

* * * * *

UNITED STATES PATENT AND TRADEMARK OFFICE
CERTIFICATE OF CORRECTION

PATENT NO. : 7,574,611 B2  Page 1 of 1
APPLICATION NO. : 11/288753
DATED : August 11, 2009
INVENTOR(S) : Daniel Scott Cohen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 858 days.

Signed and Sealed this

Seventh Day of September, 2010

David J. Kappos
*Director of the United States Patent and Trademark Office*